(12) United States Patent
Argoety et al.

(10) Patent No.: US 11,811,807 B2
(45) Date of Patent: Nov. 7, 2023

(54) CONDITIONAL SECURITY MEASURES USING ROLLING SET OF RISK SCORES

(71) Applicant: Microsoft Technology Licensing, LLC, Redmond, WA (US)

(72) Inventors: Itay Argoety, Petach Tikva (IL); Michael Shlomo Navat, Tel Aviv (IL); Idan Yehoshua Hen, Rosh Ha'Ayin (IL); Efrat Reef Guttman, Tel Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 231 days.

(21) Appl. No.: 17/332,721

(22) Filed: May 27, 2021

(65) Prior Publication Data
US 2022/0385681 A1 Dec. 1, 2022

(51) Int. Cl.
H04L 29/06 (2006.01)
H04L 9/40 (2022.01)

(52) U.S. Cl.
CPC ........ H04L 63/1425 (2013.01); H04L 63/101 (2013.01); H04L 63/1441 (2013.01)

(58) Field of Classification Search
CPC H04L 63/1425; H04L 63/101; H04L 63/1441
See application file for complete search history.

(56) References Cited

U.S. PATENT DOCUMENTS

| | | | | |
|---|---|---|---|---|
| 10,623,446 B1* | 4/2020 | Staler | ............... | H04L 63/101 |
| 10,642,995 B2* | 5/2020 | Shih | ............... | G06F 21/552 |
| 11,423,143 B1* | 8/2022 | Lin | ............... | G06F 21/552 |
| 11,552,974 B1* | 1/2023 | Bagga | ............... | H04L 65/61 |
| 2007/0072585 A1 | 3/2007 | Johnson et al. | | |
| 2013/0024238 A1 | 1/2013 | Nielson et al. | | |
| 2015/0347217 A1* | 12/2015 | Biem | ............... | G06F 11/079 714/37 |
| 2016/0173521 A1* | 6/2016 | Yampolskiy | ............... | H04L 61/5076 726/25 |
| 2016/0219067 A1* | 7/2016 | Han | ............... | H04L 63/1425 |
| 2018/0375886 A1* | 12/2018 | Kirti | ............... | H04L 63/1425 |
| 2020/0311298 A1* | 10/2020 | Dunjic | ............... | H04L 63/1433 |
| 2020/0382534 A1* | 12/2020 | Simanovsky | ............... | G06F 21/552 |
| 2021/0182699 A1* | 6/2021 | Koyyalummal | ............... | G06N 5/02 |
| 2022/0083531 A1* | 3/2022 | Buda | ............... | G06F 16/2365 |

OTHER PUBLICATIONS

"International Search Report and Written Opinion issued in PCT Application No. PCT/US22/027753", dated Jul. 26, 2022, 11 Pages.

* cited by examiner

*Primary Examiner* — Kambiz Zand
*Assistant Examiner* — Afaq Ali
(74) *Attorney, Agent, or Firm* — WORKMAN NYDEGGER

(57) ABSTRACT

Conditionally initiating a security measure in response to an estimated increase in risk imposed related to a particular user of a computing network. The risk is determined using a rolling time window. Accordingly, sudden increases in risk are quickly detected, allowing security measures to be taken quickly within that computing network. Thus, improper infiltration into a computing network is less likely to escalate or move laterally to other users or resources within the computing network. Furthermore, the security measure may be automatically initiated using settings pre-configured by the entity. Thus, the security measures go no further than what the entity instructed, thereby minimizing risk of over-reaching with the security measure.

20 Claims, 5 Drawing Sheets

CONDITIONAL SECURITY MEASURES USING ROLLING SET OF RISK SCORES

BACKGROUND

Risk scoring is a method which is based on the user related alerts and anomalous activities which are given a score by various factors that sums up to the user risks score. As an example, user risk might increase when a user's activities begin to deviate from the user's normal historical activities by performing perhaps more sensitive activities. Security analysts can review the risk score in an attempt to identify a point in time where user risk started to incline. This is particularly difficult to do in real time at the moment the user risk is increasing.

The subject matter claimed herein is not limited to embodiments that solve any disadvantages or that operate only in environments such as those described above. Rather, this background is only provided to illustrate one exemplary technology area where some embodiments describe herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The principles described herein permit for conditionally initiating a security measure in response to an estimated increase in risk imposed related to a particular user of a computing network. The risk is determined using a rolling time window. Accordingly, sudden increases in risk are quickly detected, allowing security measures to be taken quickly within that computing network. Thus, improper infiltration into a computing network is less likely to escalate or move laterally to other users or resources within the computing network.

An agent of the entity may have pre-configured a security measure to take upon detection of a sudden increase in risk. Risk scores are determined for multiple related users of the entity over a rolling window to generate a rolling set of risk scores. Each user may then be evaluated for potential risk with respect to the rolling set of risk scores (i.e., relative to the multiple related users). In particular, for a particular user, the system generates a time series of relative risk scores relative to the rolling set of scores. Then, anomalous detection is performed on that generated time series. If an anomalous increase in risk scores is detected, the pre-configured security measure is automatically taken. As an example, security credentials of the particular user may be revoked or suspended, with new credentials being issued to the user upon appropriate secure authentication.

Thus, because a rolling window is used to quickly determine increases in risk in real time, and because security remedies can be issued right away, the damage caused by security breaches can be remediated. Furthermore, the entity owning the computing network retains control over what security measures are taken. Thus, the interests of the entity are protected, minimizing risk of overreaching with the security measure.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and details through the use of the accompanying drawings in which.

DETAILED DESCRIPTION

The principles described herein permit for conditionally initiating a security measure in response to an estimated increase in risk imposed related to a particular user of a computing network. The risk is determined using a rolling time window. Accordingly, sudden increases in risk are quickly detected, allowing security measures to be taken quickly within that computing network. Thus, improper infiltration into a computing network is less likely to escalate or move laterally to other users or resources within the computing network.

An agent of the entity may have pre-configured a security measure to take upon detection of a sudden increase in risk. Risk scores are determined for multiple related users of the entity over a rolling window to generate a rolling set of risk scores. Each user may then be evaluated for potential risk with respect to the rolling set of risk scores (i.e., relative to the multiple related users). In particular, for a particular user, the system generates a time series of relative risk scores relative to the rolling set of scores. Then, anomalous detection is performed on that generated time series. If an anomalous increase in risk scores is detected, the pre-configured security measure is automatically taken. As an example, security credentials of the particular user may be revoked or suspended, with new credentials being issued to the user upon appropriate secure authentication.

Thus, because a rolling window is used to quickly determine increases in risk in real time, and because security remedies can be issued right away, the damage caused by security breaches can be remediated. Furthermore, the entity owning the computing network retains control over what security measures are taken. Thus, the interests of the entity are protected, minimizing risk of overreaching with the security measure.

Figure 1:
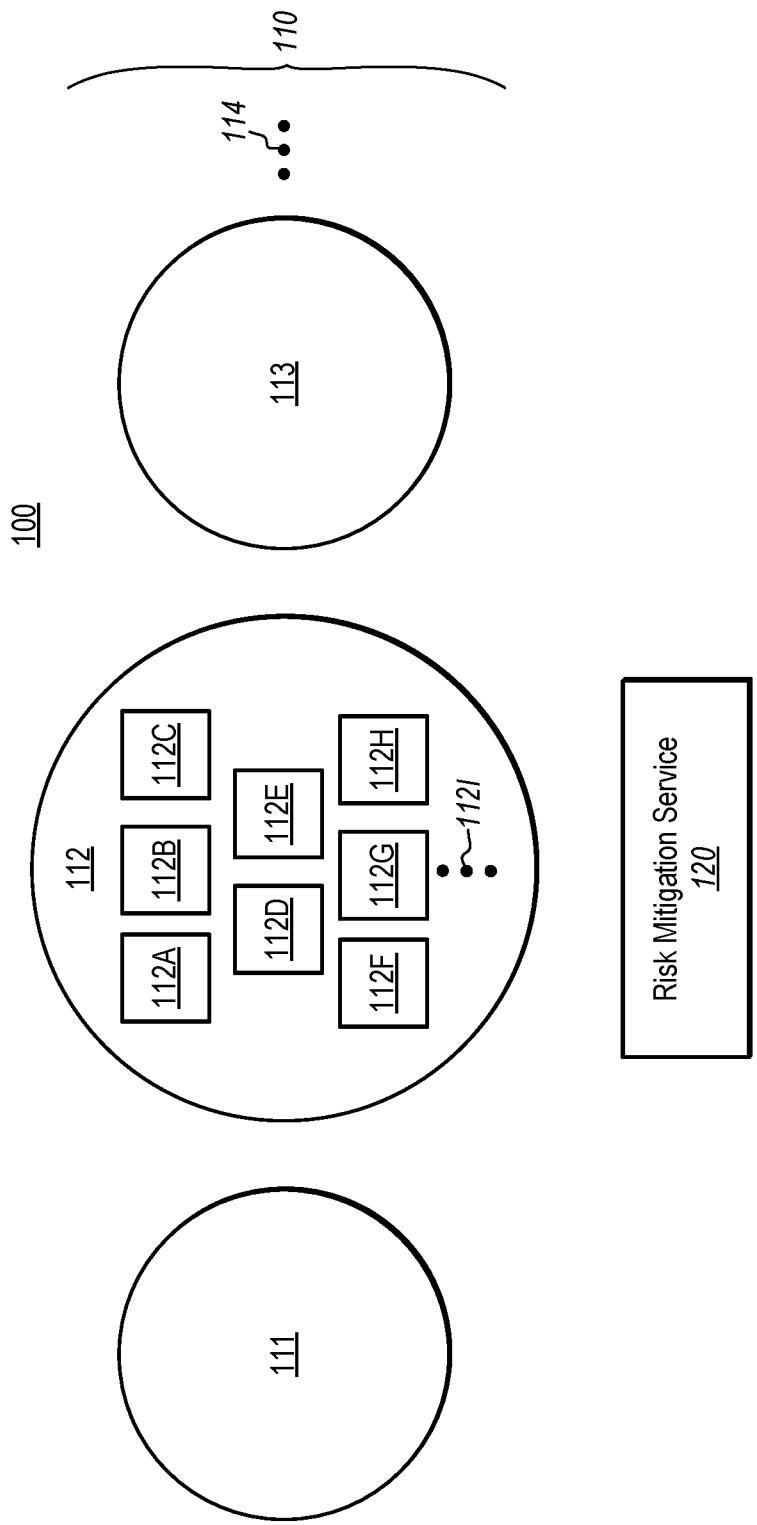
FIG. 1 illustrates an environment that includes multiple networks that are served by a risk mitigation service, in accordance with the principles described herein.

FIG. 1 illustrates an environment 100 that includes multiple networks 110 that are served by a risk mitigation service 120. Each of the networks 110 are used by a respective entity, such as a tenant of the risk mitigation service 120. Thus, the networks 110 may each be regarded as instead a tenant of the risk mitigation service 120. Thus, a network in this sense may be any system that contains resources and that implements procedures for controlling access to those resources. The risk mitigation service 120 may be implemented as one or more executable components, such as the executable component 506 described below with respect to FIG. 5.

In the illustrated example, the networks 110 include network 111, network 112 and network 113. However, the risk mitigation service 120 may serve any number of networks as represented by the ellipsis 114. As an example, if the risk mitigation service 120 operates in a private cloud or for a single entity, there may be but a single tenant and thus a single network 112. At the other extreme, the networks 110 may include countless networks. In that case, the risk mitigation service 120 may be offered in a public cloud.

Each of the networks 110 contains multiple users. For purposes of illustrative example, the network 112 is illustrated as including users 112A through 112H, with the ellipsis 112I representing that the network 112 may include any number of users. The other networks 110 may also include any number of users, though those users are not illustrated in FIG. 1 to avoid unnecessarily complicating FIG. 1 and this description.

Figure 2:
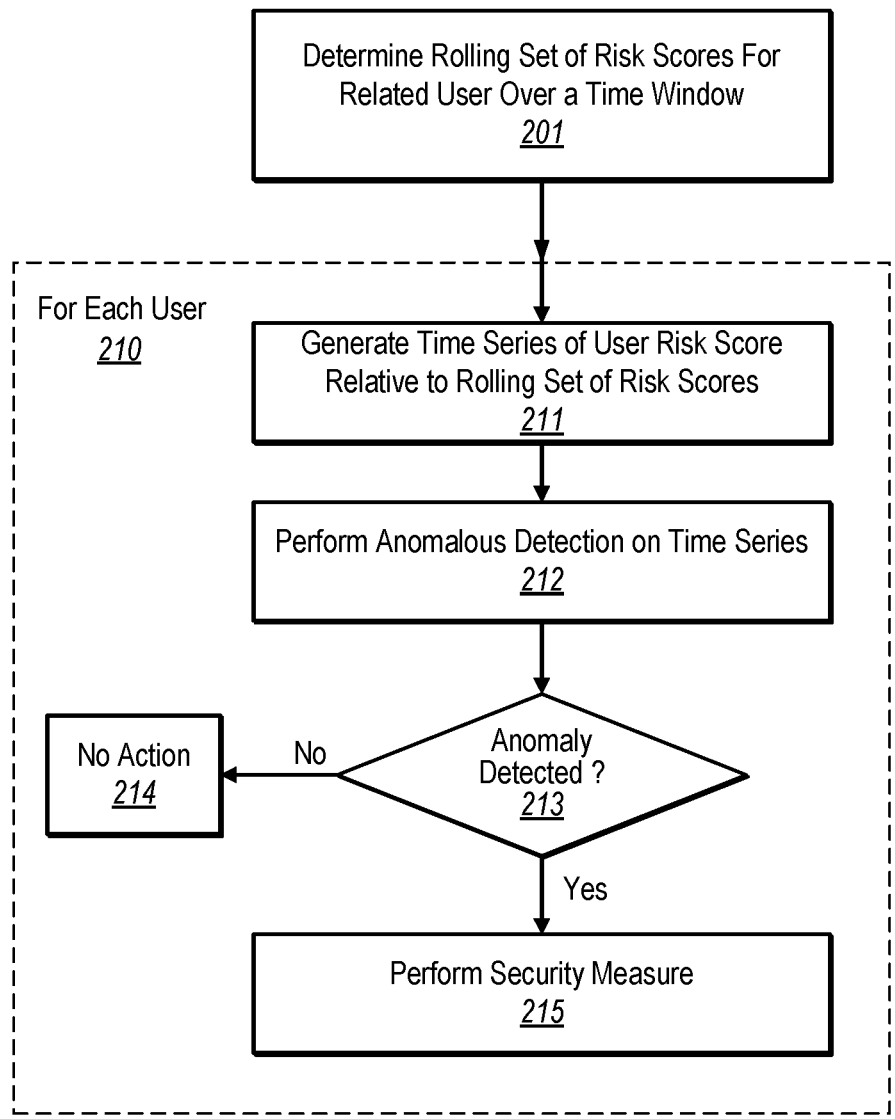
FIG. 2 illustrates a flowchart of a method for conditionally initiating a security measure, in accordance with the principles described herein.

FIG. 2 illustrates a flowchart of a method 200 for conditionally initiating a security measure. The method 200 may be performed within the environment 100 of FIG. 1. As an example, the method 200 may be performed by the risk mitigation service 120 for any of the networks 110. Accordingly, the method 200 of FIG. 2 will now be described with respect to the environment 100 of FIG. 1. In particular, though the method 200 of FIG. 2 may be performed for any of the networks 110 of FIG. 1, the method 200 will be described as being performed for the network 112 of FIG. 1. The method 200 is performed with respect to a rolling time window. Accordingly, the method 200 is frequently performed to account for the rolling of the time window.

The method 200 includes determining risk scores for related users of an entity of a rolling window to generate a rolling set of risk scores (act 201). The entity could be a tenant of a cloud service. Referring to FIG. 1, the entity could be the owner of the network 112 such that all of the users 112A through 112I are the related users. There are a variety of mechanisms for calculating risk scores. The principles described herein are not limited to any particular mechanism. However, risk scores are typically calculated based on a variety of factors involving behavior and actions of a user.

Let us take an arbitrary example in which there are 10 users A through J, and risks scores can vary from 0 to 1000. Furthermore, let us measure time as beginning at 0 and increasing monotonically. Finally, let us take the example in which the set of user scores measure since time 0 until time 5 is as follows in Table 1.

TABLE 1

| User | Time | | | | | |
|---|---|---|---|---|---|---|
| | 0 | 1 | 2 | 3 | 4 | 5 |
| A | 5 | 6 | 6 | 7 | 8 | 14 |
| B | 10 | 12 | 9 | 9 | 10 | 12 |
| C | 5 | 4 | 4 | 8 | 8 | 5 |
| D | 6 | 7 | 8 | 8 | 7 | 7 |
| E | 2 | 0 | 0 | 6 | 5 | 5 |
| F | 5 | 5 | 6 | 3 | 3 | 2 |
| G | 8 | 9 | 13 | 12 | 13 | 14 |
| H | 6 | 4 | 4 | 4 | 5 | 6 |
| I | 6 | 3 | 7 | 4 | 6 | 5 |
| J | 1 | 2 | 3 | 2 | 5 | 5 |

Now assume a time window of 4. At time 5, the rolling risk set would include all of the risk scores for all of the 10 users for time 2, 3, 4 and 5. Thus, this would include 40 risk scores in total, corresponding to all risk scores in the right 4 columns of Table 1. Let the rolling set of risk scores be represented by the variable S, and each risk score being defined by $s_{xy}$ where x represents the letter of the user A through J, and y represents the time. Thus, the risk score of user C at time 4 would be represented as $s_{C4}$.

Referring back to FIG. 2, for each of the users, the content of dashed-lined box 210 is performed. A time series is generated for a relative risk score of each user. The relative risk score is relative to the rolling set of risk scores. As an example, suppose that the relative risk score is a function of the percentage of raw scores in the rolling window that are less than the raw score. Now suppose that each relative risk score is to be represented by $R_{xy}$ where x represents the letter of the user A through J, and y represents the time.

Consider a case where a time series of relative risk scores is to be generated for user A. The first risk score of user A in the time window is $s_{A2}$ which is 6. The number of scores that are less than 6 in the rolling set of risk scores is 17. And since there are 40 total risk scores in the rolling set of risk scores, the relative risk score $R_{A2}$ is 17/40 or 0.425. The second risk score of user A in the time window is $s_{A3}$ which is 7. The number of scores that are less than 7 in the rolling set of risk scores is 22. So, the relative risk score $R_{A3}$ is 22/40 or 0.55. The third risk score of user A in the time window is $s_{A4}$ which is 8. The number of scores that are less than 8 in the rolling set of risk scores is 26. So, the relative risk score $R_{A4}$ is 26/40 or 0.65. The final risk score $s_{A5}$ of user A in the time window is 14. The number of scores that are less than 14 in the rolling set of risk scores is 38. So, the relative risk score $R_{A4}$ is 38/40 or 0.95. So in this example, the time series of relative risk scores for user A is 0.425, 0.55, 0.65 and 0.95.

Referring back to FIG. 2, the service performs anomalous detection on the time series (act 212). In this example, anomalous detection is performed on the series 0.425, 0.55, 0.65 and 0.95. There are a variety of conventional algorithms used to perform anomaly detection of a time series. The principles described herein are not limited to any particular time series anomaly detection function. However, in one embodiment, the ARIMA unsupervised time series anomaly detection algorithm is used.

Referring to FIG. 2, if no anomaly is found in the time series (decision block 213), then no action is taken at this time (act 214). However, if an anomalous increase is found in the generated time series of the relative risk score of the particular user ("Yes" in decision block 213), then the service automatically performs a security measure configured by the entity (act 215).

Several examples of the detection of an increase in the time series of relative risk scores will now be described. In one example, the anomalous increase is detected by determining that a most recent risk score of the generated time series is above a pre-determined percentage of the rolling set of risk scores. For instance, suppose that the pre-determined percentage is 90 percent. In that case, the generated time series 0.425, 0.55, 0.65 and 0.95 would result in the detection of an anomaly since the final relative risk score 0.95 is above 90 percent.

The percentage thresholds may be changed adaptively. Thus, the threshold may be varied from 90 percent in order to avoid unnecessary triggering of security measures, or to avoid missing security problems. The threshold may be adjusted by an administrator of the entity should the entity desired to throttle back the detection of anomalous increases in risk scores.

In another example, an anomalous increase is detected by determining that a last risk score of the generated time series is above a first pre-determined percentage of the rolling set of risk scores, and that a penultimate risk score of the generated time series is below a second pre-determined percentage of the rolling set of risk scores, the second pre-determined percentage being less than the first pre-determined percentage. As an example, suppose that the first threshold is 90 percent, and the second threshold is 75 percent. The generated time series 0.425, 0.55, 0.65 and 0.95 would result in the detection of an anomaly since the final relative risk score 0.95 is above 90 percent, and since the second-to-last risk score 0.65 is below 75 percent.

This technique has the advantage of refraining from too frequently finding a sudden increase where the particular user ordinarily has a higher risk score, and thus might otherwise be inconvenienced by having security measures frequently taken. As an example, user G of Table 1 characteristically has high risk scores. The raw risk scores $s_{G2}$ through $s_{G5}$ are 13, 12, 13 and 14, resulting in relative risk scores $R_{G2}$ through $R_{G5}$ of 0.9, 0.85, 0.9 and 0.95. The second-to-last relative risk score is 0.9, which is above the lower threshold, so an anomalous increase is not detected even though the last relative risk score is 0.95, above the higher 90 percent threshold. Thus, the technique of having two thresholds prevents the user G from having security measures taken every time a new raw risk score is gathered.

In one embodiment, the anomalous increase is an increase relative to the rolling set of risk scores of a later relative risk score in the generated time series as compared to an earlier relative risk score in the generated time series. Let S be the set of scores received during the scoring period in any context in which the risk scores are comparable, such as the risk score of users from the same organization or the same geographical region. Note that the risk score set can include risk scores with no requirement that risk scores be calculated at the same time for all users, as was the case for Table 1. Let $x_0, x_1 \in S$ be the risk scores of the tested user which were received in this order. Let $h \in (0,1)$ be the lower bound of the top ranked risk scores. Let $l \in (0,1)$ be the upper bound of the bottom ranked risk scores such that $h > l$.

The lower and upper bounds of the ranked risks h and l above can be constant values. For example, l can be equal to 0.75 to mark the bottom percentage and h can be equal to 0.9 to mark the top percentage. The bounds can also be adaptive based on the context and can be transferred or shared between different contexts. A sudden increase in risk score of the tested user from $x_0$ to $x_1$ exists if the following is true:

$$\frac{|\{s \in S, x_0 > s\}|}{|S|} < l \lor \frac{|\{s \in S, x_1 > s\}|}{|S|} > h \quad (i)$$

Figure 3:
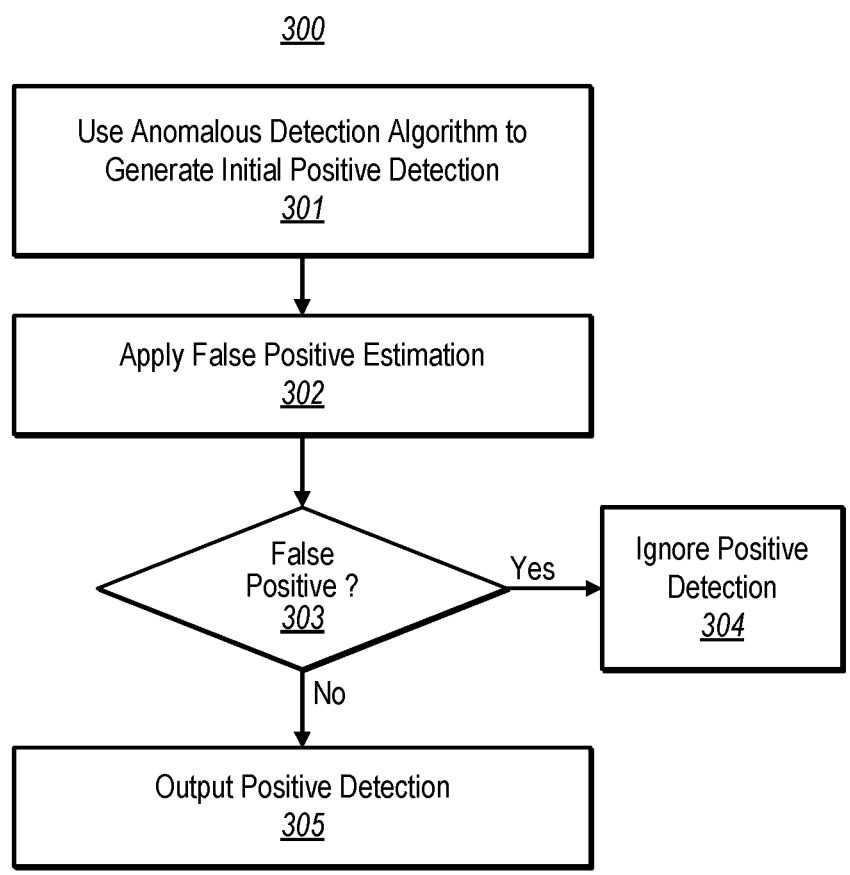
FIG. 3 illustrates a flowchart of an example method for performing of the anomalous detection on the time series of FIG. 1.

FIG. 3 illustrates a flowchart of a method 300 for performing anomalous detection on the time series, and represents and example of act 212 of the method 200 of FIG. 2. The method 300 includes using an anomalous detection algorithm to generate an initial positive detection of an anomaly in the time series (act 301). Then false positive detection logic may be applied (act 302) to estimate whether or not initial positive detection is a false positive (decision block 303). If the positive detection is estimated to be a false positive ("Yes" in decision block 303), then the initial positive detection is ignored (act 304). On the other hand, if the initial positive detection is estimated to not be a false positive ("No" in decision block 303), the positive detection is output (act 305). Referring to FIG. 2, this would result in an anomaly being detected ("Yes" in decision block 213).

An example of a false positive may be if the number of risk score samples is too small (e.g., below 10 risk scores) so as not to be a reliable standard against which user risk scores can be compared to detect true risk behavior. Another example of a false positive may be that the risk score itself (although being relatively high with respect to the rolling set of risk scores) is still well in the safe range compared to the behavior of all entities (e.g., across all of the networks 110).

Figure 4:
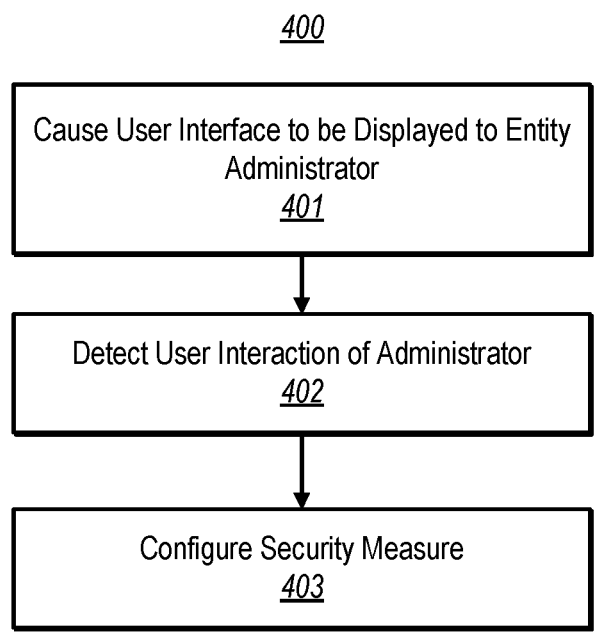
FIG. 4 illustrates a flowchart of an example method for pre-configuring the security measure performed in the method of FIG. 1.

As previously mentioned, the security measure performed by the service may be configured by the entity itself. FIG. 4 illustrates a flowchart of a method 400 for pre-configuring the security measure. The method 400 may be performed by the risk mitigation service 120 of FIG. 1. The service causes a user interface to be displayed to an administrator of the entity (act 401). Thereafter, the service detects user interaction of the entity administrator (act 402). The service then sets the security measure in response to administrator interaction with the user interface (act 403). This configuration is performed in advance of the performance of the method 200 against the users of that entity.

The configuration may specify a fixed security measure that is applied whenever an increase is detected across all users. Alternatively, the security measure may depend on the user or the role of the user. Alternatively, or in addition, the security measure may depend on the severity of the increase. Example security measures that the entity administrator might set include electronically notifying an administrator of the entity, suspending a credential of the particular user, revoking or suspending authorization of the particular user to access at least a subset of computing resources of the entity. Another option is to automatically establish a secure session with the particular user, and establishing new credentials with the particular user via the secure session.

Accordingly, the principles described herein quickly determine whether there is a sudden increase in risk posed by a particular user within an entity, allowing for more quick resolution of a potential security breach before further damage is done by the breach. In addition, the entity has say into what the security measure is to be, allowing for security measures to be taken potentially immediately and automatically without taking away the control the entity has over their own security. Because the principles described herein are performed in the context of a computing system, some introductory discussion of a computing system will be described with respect to FIG. 5.

Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 5:
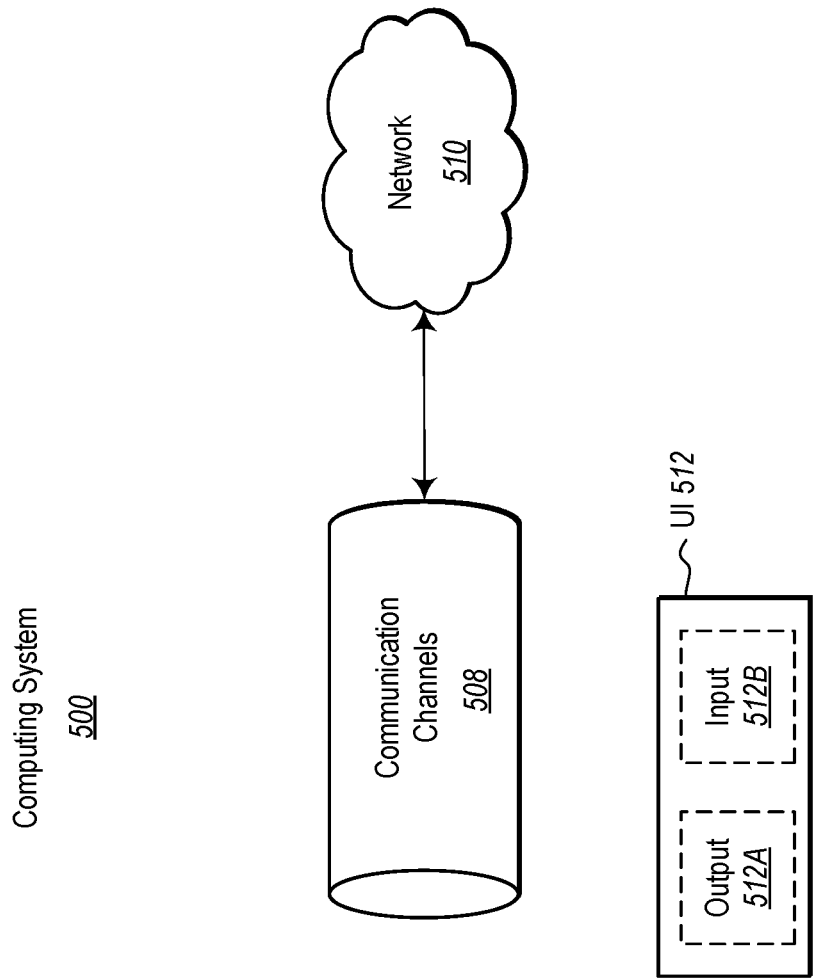
FIG. 5 illustrates an example computing system in which the principles described herein may be employed.
Figure 5:
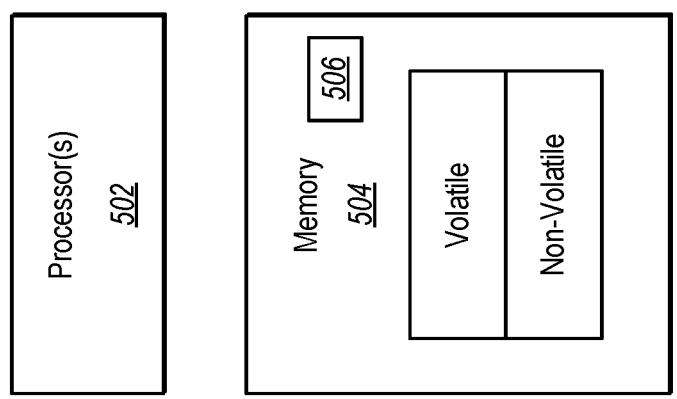

As illustrated in FIG. 5, in its most basic configuration, a computing system 500 includes at least one hardware processing unit 502 and memory 504. The processing unit 502 includes a general-purpose processor. Although not required, the processing unit 502 may also include a field programmable gate array (FPGA), an application specific integrated circuit (ASIC), or any other specialized circuit. In one embodiment, the memory 504 includes a physical system memory. That physical system memory may be volatile, non-volatile, or some combination of the two. In a second embodiment, the memory is non-volatile mass storage such as physical storage media. If the computing system is distributed, the processing, memory and/or storage capability may be distributed as well.

The computing system 500 also has thereon multiple structures often referred to as an "executable component". For instance, the memory 504 of the computing system 500 is illustrated as including executable component 506. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods (and so forth) that may be executed on the computing system. Such an executable component exists in the heap of a computing system, in computer-readable storage media, or a combination.

One of ordinary skill in the art will recognize that the structure of the executable component exists on a computer-readable medium such that, when interpreted by one or more processors of a computing system (e.g., by a processor thread), the computing system is caused to perform a function. Such structure may be computer readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hard coded or hard wired logic gates, that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data. If such acts are implemented exclusively or near-exclusively in hardware, such as within a FPGA or an ASIC, the computer-executable instructions may be hard-coded or hard-wired logic gates. The computer-executable instructions (and the manipulated data) may be stored in the memory 504 of the computing system 500. Computing system 500 may also contain communication channels 508 that allow the computing system 500 to communicate with other computing systems over, for example, network 510.

While not all computing systems require a user interface, in some embodiments, the computing system 500 includes a user interface system 512 for use in interfacing with a user. The user interface system 512 may include output mechanisms 512A as well as input mechanisms 512B. The principles described herein are not limited to the precise output mechanisms 512A or input mechanisms 512B as such will depend on the nature of the device. However, output mechanisms 512A might include, for instance, speakers, displays, tactile output, virtual or augmented reality, holograms and so forth. Examples of input mechanisms 512B might include, for instance, microphones, touchscreens, virtual or augmented reality, holograms, cameras, keyboards, mouse or other pointer input, sensors of any type, and so forth.

Embodiments described herein may comprise or utilize a special-purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmission media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then be eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special-purpose computing system, or special-purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing system, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For the processes and methods disclosed herein, the operations performed in the processes and methods may be implemented in differing order. Furthermore, the outlined operations are only provided as examples, an some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicate by the appended claims rather than by the foregoing description. All changes which come within the meaning and range of equivalency of the claims are to be embraced within their scope.

What is claimed is:

1. A computing system comprising:
one or more processors; and
one or more computer-readable media having thereon computer-executable instructions that are structured such that, if executed by the one or more processors, causes the computing system to conditionally initiate a security measure by:
determining risk scores for a plurality of related users of an entity over a rolling time window to generate a rolling set of risk scores;
generating a time series of a relative risk score of a particular user, the relative risk score being relative to the rolling set of risk scores, the particular user being one of the plurality of related users;
performing anomalous detection on the time series;
detecting an anomalous increase in the generated time series of the relative risk score when a last risk score of the generated time series is above a first pre-determined percentage of the rolling set of risk scores, and a penultimate risk score of the generated time series is below a second pre-determined percentage of the rolling set of risk scores; and
in response to detecting the anomalous increase, automatically performing a security measure configured by the entity.

2. The computing system in accordance with claim 1, the computer-executable instructions being structured such that, if executed by the one or more processors, the anomalous increase is an increase relative to the rolling set of risk scores of a later relative risk score in the generated time series as compared to an earlier relative risk score in the generated time series.

3. The computing system in accordance with claim 1, the computer-executable instructions being structured such that, if executed by the one or more processors, the anomalous increase is detected by determining that a most recent risk score of the generated time series is above a pre-determined percentage of the rolling set of risk scores.

4. The computing system in accordance with claim 1, the computer-executable instructions being structured such that, if executed by the one or more processors, the anomalous increase is detected by:
   determining a percentage threshold; and
   determining that a most recent risk score of the generated time series is above the determined percentage threshold.

5. The computing system in accordance with claim 1, the second pre-determined percentage being less than the first pre-determined percentage.

6. The computing system in accordance with claim 1, the computer-executable instructions being structured such that, if executed by the one or more processors, the performance of the anomalous detection on the time series comprises:
   using an anomalous detection algorithm to generate an initial positive detection of an anomaly in the time series;
   applying false positive detection logic to estimate whether the initial positive detection is a false positive; and
   outputting a positive detection if the initial positive detection is not determined by the false positive detection logic to be a false positive.

7. The computing system in accordance with 1, the computer-executable instructions being structured such that, if executed by the one or more processors, the computing system causes a user interface to be displayed to an administrator of the entity, and sets the security measure in response to administrator interaction with the user interface.

8. A method for conditionally initiating a security measure in response to an estimated increase in risk imposed related to a particular user of a computing network, the method, performed by a computing system, comprising:
   determining risk scores for a plurality of related users of an entity over a rolling time window to generate a rolling set of risk scores;
   generating a time series of a relative risk score of a particular user, the relative risk score being relative to the rolling set of risk scores, the particular user being one of the plurality of related users;
   performing anomalous detection on the time series;
   detecting an anomalous increase in the generated time series of the relative risk score when a last risk score of the generated time series is above a first pre-determined percentage of the rolling set of risk scores, and a penultimate risk score of the generated time series is below a second pre-determined percentage of the rolling set of risk scores; and
   in response to detecting the anomalous increase, automatically performing a security measure configured by the entity.

9. The method in accordance with claim 8, the anomalous increase being an increase relative to the rolling set of risk scores of a later relative risk score in the generated time series as compared to an earlier relative risk score in the generated time series.

10. The method in accordance with claim 8, the anomalous increase being detected by determining that a most recent risk score of the generated time series is above a pre-determined percentage of the rolling set of risk scores.

11. The method in accordance with claim 8, the anomalous increase being detected by:
    determining a percentage threshold; and
    determining that a most recent risk score of the generated time series is above the determined percentage threshold.

12. The method in accordance with claim 8, wherein the second pre-determined percentage being less than the first pre-determined percentage.

13. The method in accordance with claim 8, the performance of the anomalous detection on the time series comprises:
    using an anomalous detection algorithm to generate an initial positive detection of an anomaly in the time series;
    applying false positive detection logic to estimate whether the initial positive detection is a false positive; and
    outputting a positive detection if the initial positive detection is not determined by the false positive detection logic to be a false positive.

14. The method in accordance with claim 13, the applying false position detection logic comprising:
    determining whether or not a sample size of the rolling set of risk scores is above a pre-determined threshold.

15. The method in accordance with claim 13, the applying false position detection logic comprising:
    determining whether or not a most recent risk score in the generated time series is below a pre-determined threshold.

16. The method in accordance with claim 8, the security measure comprising electronically notifying an administrator of the entity.

17. The method in accordance with claim 8, the security measure comprising suspending a credential of the particular user.

18. The method in accordance with claim 8, the security measure comprising revoking or suspecting authorization of the particular user to access at least a subject of computing resources of the entity.

19. The method in accordance with claim 8, the security measure comprising establishing a secure session with the particular user, and establishing new credentials with the particular user via the secure session.

20. A computer program product comprising one or more computer-readable media having thereon computer-executable instructions that are structured such that, if executed by the one or more processors of a computing system, the computing system would be caused to conditionally initiating a security measure by:
    determining risk scores for a plurality of related users of an entity over a rolling time window to generate a rolling set of risk scores;
    generating a time series of a relative risk score of a particular user, the relative risk score being relative to the rolling set of risk scores, the particular user being one of the plurality of related users;
    performing anomalous detection on the time series;
    detecting an anomalous increase in the generated time series of the relative risk score when a last risk score of the generated time series is above a first pre-determined percentage of the rolling set of risk scores, and a penultimate risk score of the generated time series is below a second pre-determined percentage of the rolling set of risk scores; and
    in response to detecting the anomalous increase, automatically performing a security measure configured by the entity.

* * * * *